(12) United States Patent  (10) Patent No.: US 6,637,954 B2
Kato  (45) Date of Patent: Oct. 28, 2003

(54) SHUTTER MECHANISM FOR CAMERAS

(75) Inventor: Koichi Kato, Saitama-ken (JP)

(73) Assignee: Fuji Photo Optical Co., Ltd., Saitama-Ken (JP)

( * ) Notice: Subject to any disclaimer, the term of this patent is extended or adjusted under 35 U.S.C. 154(b) by 0 days.

(21) Appl. No.: 10/108,613

(22) Filed: Mar. 27, 2002

(65) Prior Publication Data
US 2002/0141754 A1 Oct. 3, 2002

(30) Foreign Application Priority Data
Mar. 28, 2001 (JP) ........................... 2001-091610

(51) Int. Cl.7 ................................. G03B 9/08
(52) U.S. Cl. ........................................ 396/449
(58) Field of Search ....................... 396/449, 450, 396/451, 501, 463

(56) References Cited

U.S. PATENT DOCUMENTS

| 4,051,497 A | * | 9/1977 | Harvey | 396/449 |
| 5,255,037 A | * | 10/1993 | Kobayashi | 396/449 |
| 5,258,797 A | * | 11/1993 | Oyoshi et al. | 396/463 |
| 5,687,417 A | * | 11/1997 | Furlani et al. | 396/449 |
| 5,721,995 A | * | 2/1998 | Katsura et al. | 396/501 |
| 5,765,060 A | * | 6/1998 | Shimizu | 396/508 |
| 6,222,684 B1 | | 4/2001 | Nishimura | 359/740 |

FOREIGN PATENT DOCUMENTS

JP  01-243747  9/1989

* cited by examiner

Primary Examiner—Christopher Mahoney
(74) Attorney, Agent, or Firm—Joseph Levi, Esq.; Clifford Chance US LLP

(57) ABSTRACT

A lens shutter comprises shutter blades capable of moving within a shutter chamber of a camera to open and close a lens aperture. A stopper capable of entering into movement loci of the shutter blades selectively takes a position for aperture restriction that stops the shutter blades immediately before they reach positions for full opening of the lens aperture, or a position for restriction release that allows the shutter blades to reach the positions for full opening of the lens aperture. The stopper is urged by a spring toward the position for aperture restriction and is retracted by a releasing member to the position for restriction release when the lens aperture is to be fully opened.

4 Claims, 10 Drawing Sheets

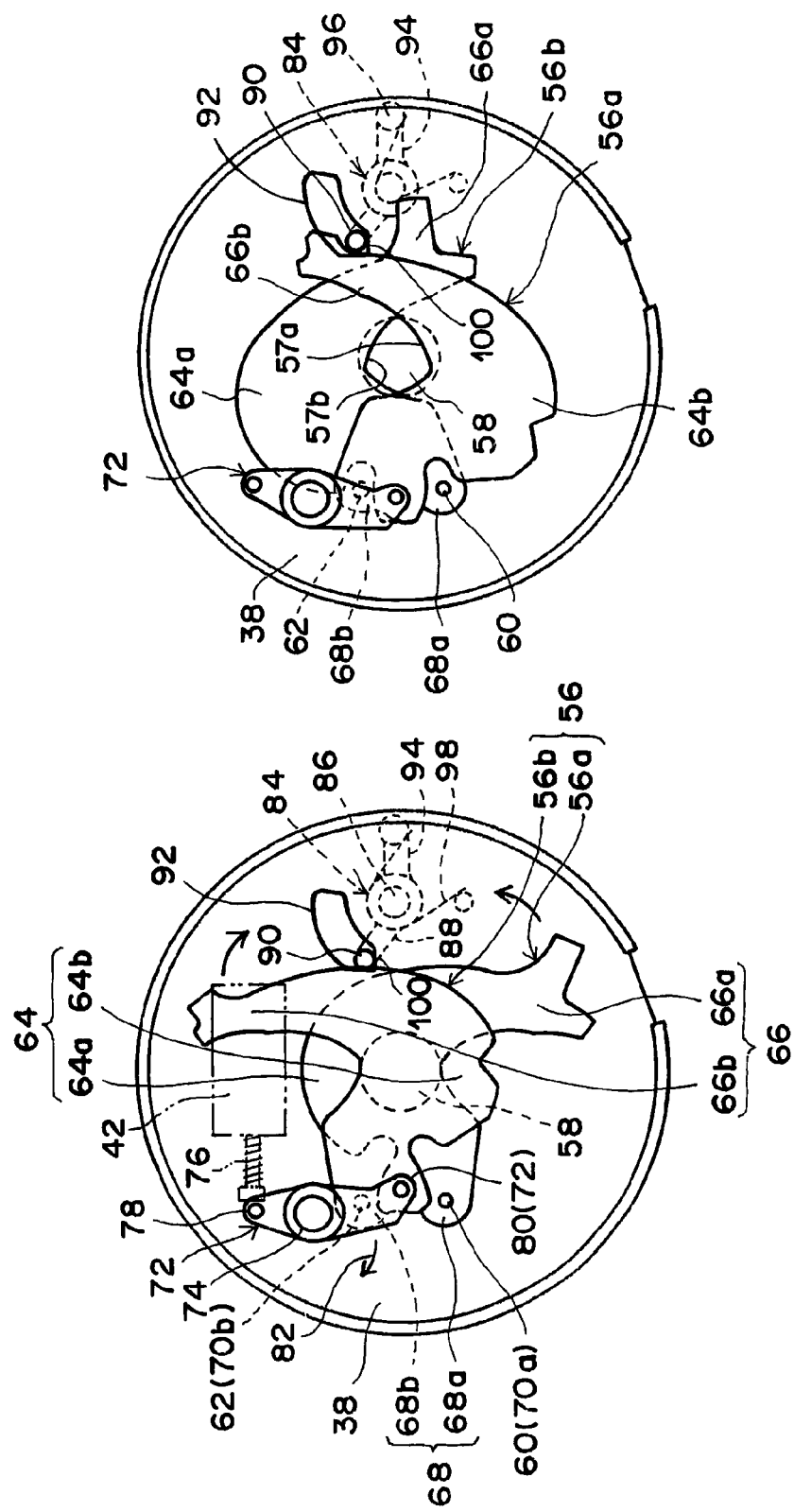

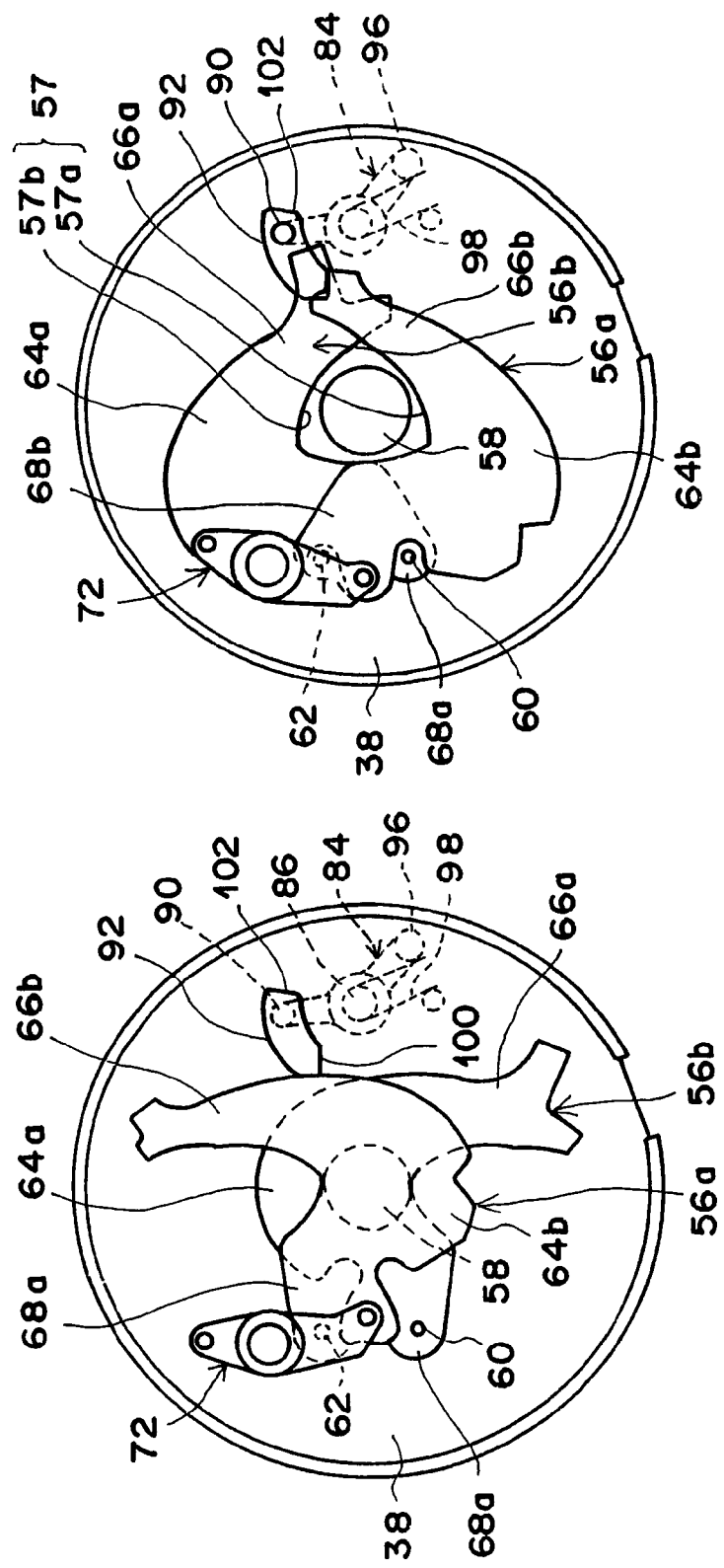

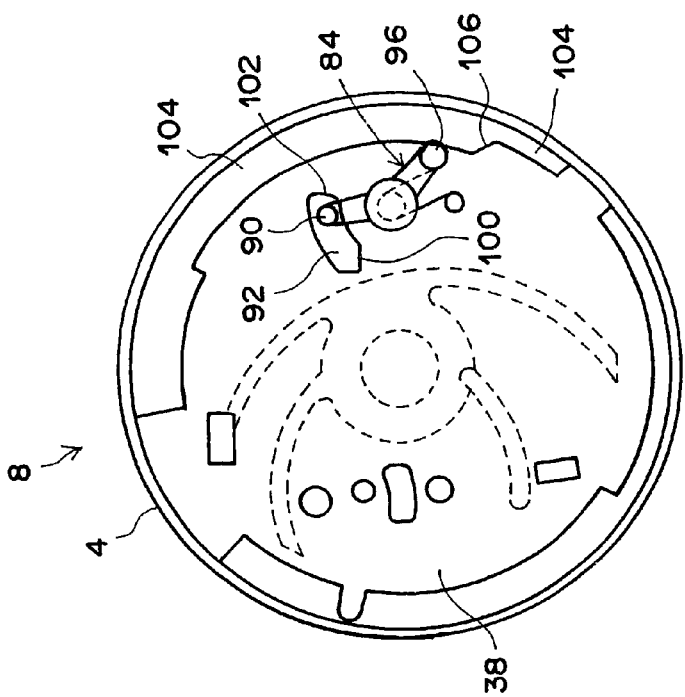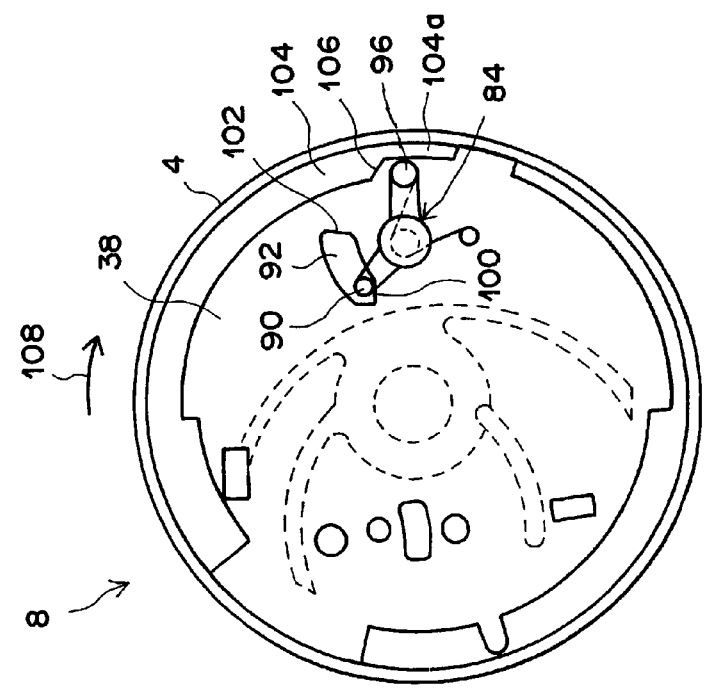

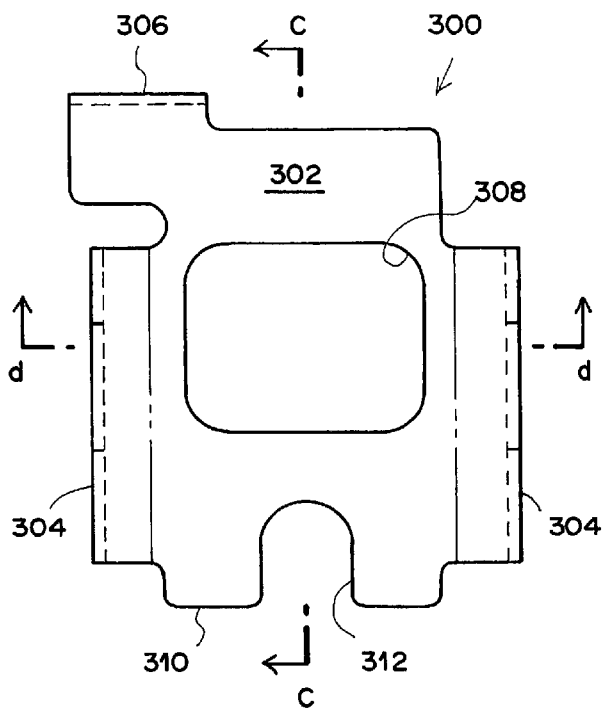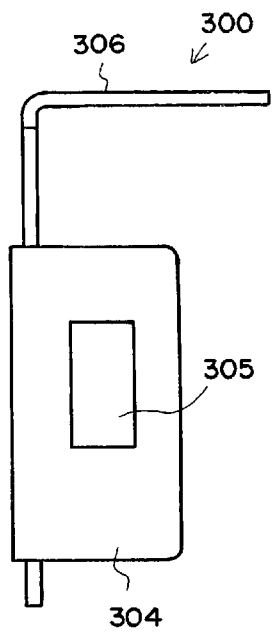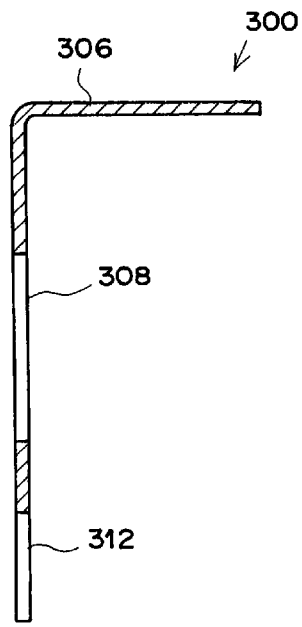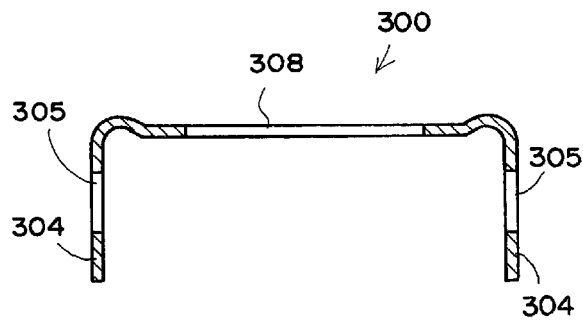

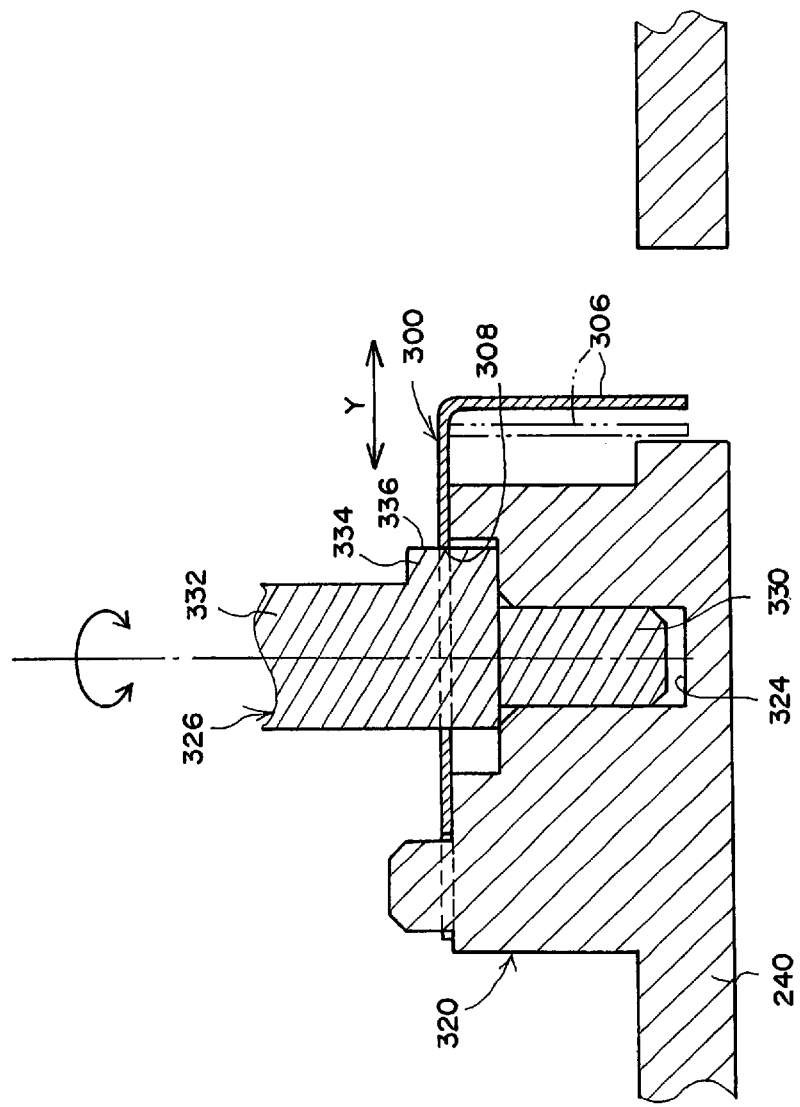
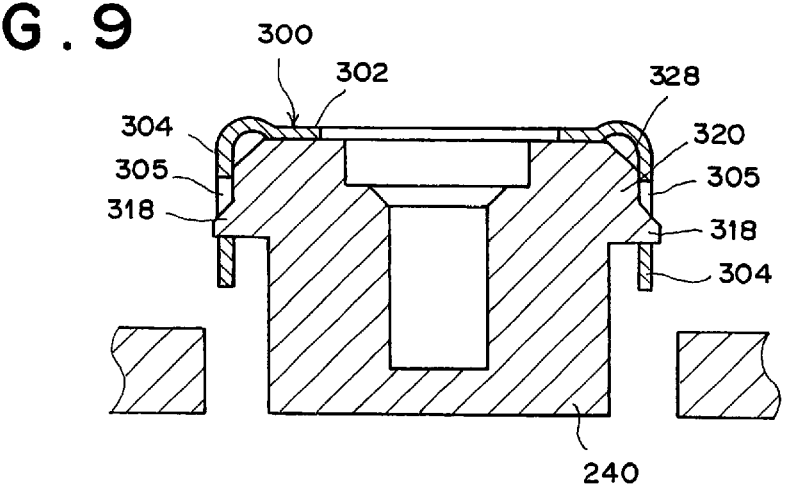

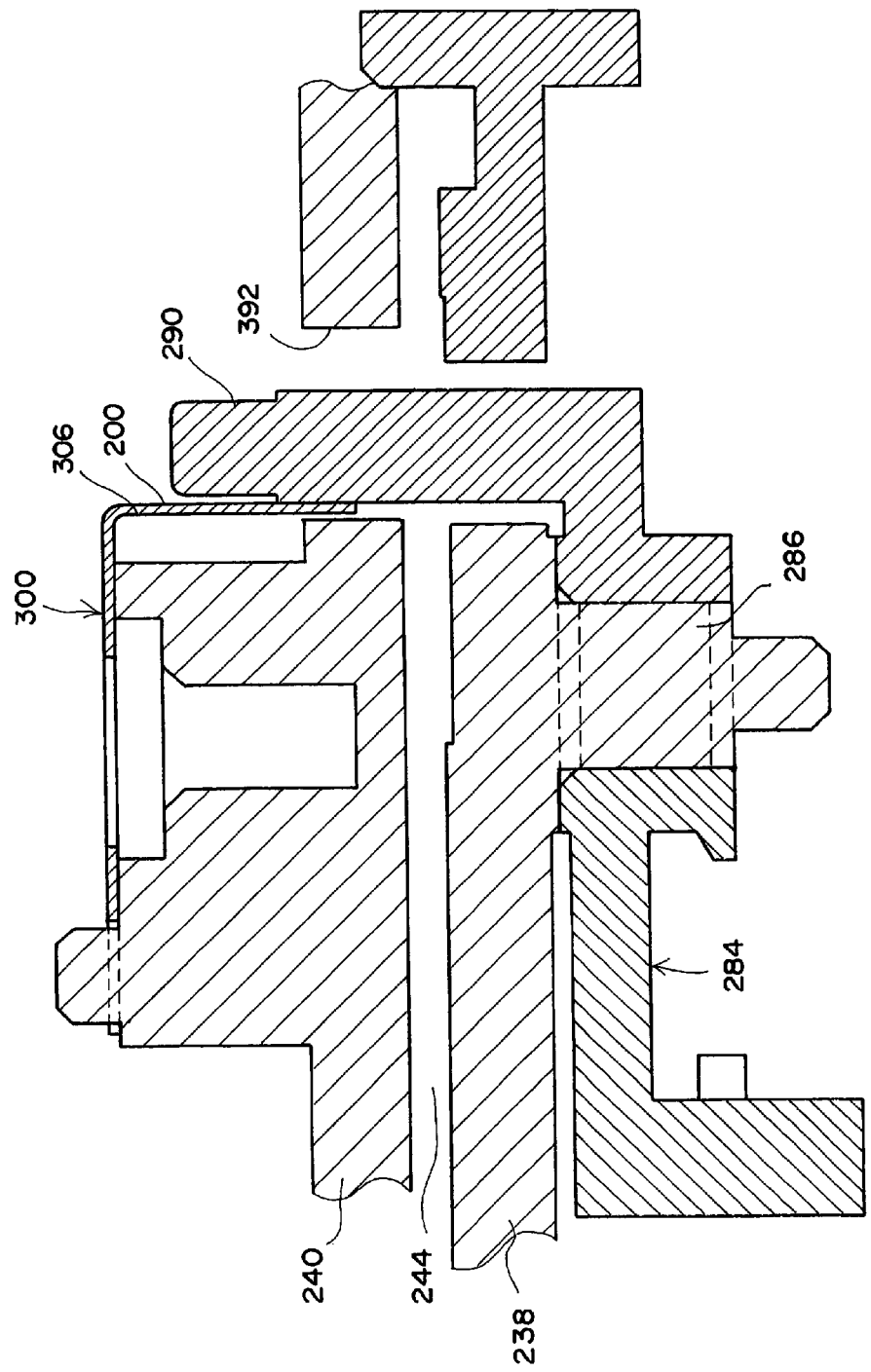

SHUTTER MECHANISM FOR CAMERAS

CROSS-REFERENCE TO RELATED APPLICATION

This application claims priority to Japanese patent application number 2001-091610 filed Mar. 28, 2001.

BACKGROUND OF THE INVENTION

1. Field of the Invention

This invention relates to a shutter mechanism for a camera. This invention particularly relates to a shutter mechanism for a camera provided with a zoom lens, wherein a lens aperture on a wide side is restricted.

2. Description of the Related Art

In cases where wide angle photographing (i.e., wide side photographing) is performed with cameras provided with zoom lenses, besides rays having small angles of deflection with respect to an optical axis of the lens, the rays having large angles of deflection with respect to the optical axis of the lens also impinge upon the lens. Therefore, in such cases, aberration becomes larger than in the cases of telescopic photographing (i.e., zoom side photographing), and a marginal blur becomes apt to occur with the obtained image. Accordingly, in cases where the wide angle photographing is performed, ordinarily, a shutter aperture is stopped down, such that the rays having large angles of deflection may be blocked, and an image having good image quality and free from a blur at the marginal area may be obtained.

As a mechanism for stopping down the lens aperture, an aperture opening restricting device disclosed in, for example, Japanese Unexamined Patent Publication No. 2000-235209 has heretofore been known. The disclosed aperture opening restricting device is provided with a restricting member for coming into abutment with shutter blades immediately before the shutter blades reach the positions for full opening of the lens aperture during opening movements of the shutter blades, and thereby obstructing further opening movements of the shutter blades. The restricting member is an approximately L-shaped member and has a restriction pin-at one end of the L-shaped member. When the shutter blades perform the opening movements, the restriction pin enters into the movement loci of the shutter blades, comes into abutment with the shutter blades, and thereby stops the shutter blades. The restricting member has its rotation center at a corner area of the L-shaped member, and the other end side of the restricting member takes on the form of a projecting member. The projecting member comes into abutment with a cam, which is formed in a slant state on an internal surface of a cam cylinder. The position of the restriction pin for obstructing the opening movements of the shutter blades is determined by the position, at which the cam and the projecting member abut against each other.

With the aperture opening restricting device described above, the degree of opening of the lens aperture is determined by the position, at which the projecting member and the cam engage with each other. Therefore, the problems may often occur in that the degree of opening of the lens aperture vary for different photographing operations due to a slight shift of the position, at which the projecting member and the cam engage with each other. Therefore, there is the risk that the image quality of the obtained image will fluctuate. Also, there is a distance between the restriction pin and the position, at which the projecting member and the cam engage with each other, and therefore there is the risk that the position of the restriction pin will become indefinite due to fitting looseness of the restricting member, or the like.

SUMMARY OF THE INVENTION

The primary object of the present invention is to provide a shutter mechanism for a camera, wherein a predetermined lens aperture diameter is capable of being obtained reliably.

The present invention provides a shutter mechanism for a camera, comprising:

i) a lens shutter constituted of a plurality of shutter blades, which are capable of being moved within a shutter chamber of a camera in order to open and close a lens aperture, and ii) a stopper, which is capable of entering into movement loci of the shutter blades, the stopper selectively taking a position for aperture restriction that stops the shutter blades immediately before the shutter blades reach positions for full opening of the lens aperture during opening movements of the shutter blades, or a position for restriction release that allows the shutter blades to reach the positions for the full opening of the lens aperture, wherein the stopper is urged by a spring toward the position for the aperture restriction, and the stopper is retracted by stopper releasing means to the position for the restriction release in cases where the lens aperture is to be fully opened.

The shutter mechanism for a camera in accordance with the present invention may be modified such that the stopper is a lever for rotation around a supporting point, which lever is provided with a stopping section that stops the shutter blades, and the lever is urged by the spring such that the stopping section of the lever is ordinarily in abutment with an abutment surface, which is formed on the side of a wall member constituting the shutter chamber and is located at a predetermined position within the movement loci of the shutter blades.

Also, in such cases, the shutter mechanism for a camera in accordance with the present invention may be modified such that the lever is provided with a section-to-be-pushed, which is formed on the side opposite to the stopping section with the supporting point of the lever intervening between the section-to-be-pushed and the stopping section, and the section-to-be-pushed is adapted to be pushed by the stopper releasing means such that the stopping section is retracted to the position for the restriction release.

Further, the shutter mechanism for a camera in accordance with the present invention may be modified such that a lever engagement member is associated with the wall member constituting the shutter chamber, such that the position of the lever engagement member is capable of being adjusted in a direction heading towards the stopping section of the lever and in a direction heading away from the stopping section of the lever, and the abutment surface is formed on the lever engagement member.

With the shutter mechanism for a camera in accordance with the present invention, the stopper, which is capable of entering into the movement loci of the shutter blades in order to obstruct the opening movements of the shutter blades, is urged by the spring toward the position for the aperture restriction. In cases where the lens aperture is to be fully opened, the stopper is retracted by the stopper releasing means to the position for the restriction release. Therefore, the position for the aperture restriction, which the stopper takes, is kept at the predetermined position. Accordingly, a predetermined lens aperture diameter is capable of being obtained reliably.

With the shutter mechanism for a camera in accordance with the present invention, the stopper may be the lever for rotation around the supporting point, which lever is provided with the stopping section that stops the shutter blades, and the lever may be urged by the spring such that the stopping section of the lever is ordinarily in abutment with the abutment surface, which is formed on the side of the wall member constituting the shutter chamber and is located at the predetermined position within the movement loci of the shutter blades. In such cases, with the simple constitution, the position for the aperture restriction, which the stopper takes, is capable of being kept at the predetermined position, and the predetermined lens aperture diameter is capable of being obtained reliably.

Also, with the shutter mechanism for a camera in accordance with the present invention, the lever may be provided with the section-to-be-pushed, which is formed on the side opposite to the stopping section with the supporting point of the lever intervening between the section-to-be-pushed and the stopping section, and the section-to-be-pushed may be pushed by the stopper releasing means such that the stopping section is retracted to the position for the restriction release. In such cases, the accurate restriction of the lens aperture and the full opening of the lens aperture are capable of being achieved with the simple constitution.

Further, with the shutter mechanism for a camera in accordance with the present invention, the abutment surface maybe formed on the lever engagement member, which is associated with the wall member constituting the shutter chamber, such that the position of the lever engagement member is capable of being adjusted in the direction heading towards the stopping section of the lever and in the direction heading away from the stopping section of the lever. In such cases, the position of the stopping section of the stopper is capable of being altered.

Therefore, regardless of fluctuation in accuracy of products (or parts), the accurate exposure opening degree, i.e. the accurate lens aperture diameter, is capable of being set reliably at the stage of camera production.

BRIEF DESCRIPTION OF THE DRAWINGS

FIG. 2A is a schematic front view showing a shutter chamber in a state, in which a stopper has already been located at a position for aperture restriction before shutter blades begin lens aperture opening movements, FIG. 2B is a schematic front view showing the shutter chamber in a state, in which the shutter blades have begun the lens aperture opening movements and have come into abutment with the stopper immediately before the shutter blades reach positions for full opening of the lens aperture, FIG. 3A is a schematic front view, similar to FIG. 2A, showing the shutter chamber in a state, in which the stopper has already been retracted to a position for restriction release before the shutter blades begin lens aperture opening movements, FIG. 3B is a schematic front view, similar to FIG. 2B, showing the shutter chamber in a state, in which the shutter blades have begun the lens aperture opening movements and have reached the positions for the full opening of the lens aperture, FIG. 4A is a schematic front view showing a shutter unit in a state, in which stopper releasing means allows the stopper to be located at the position for the aperture restriction, FIG. 4B is a schematic front view showing the shutter unit in a state, in which the stopper releasing means operates in order to retract the stopper to the position for the restriction release, FIG. 6A is a plan view showing the lever engagement member, FIG. 6B is a side view showing the lever engagement member, FIG. 6C is a sectional view taken on line c—c of FIG. 6A, in which only the sectional part is shown, FIG. 6D is a sectional view taken on line d—d of FIG. 6A, in which only the sectional part is shown, FIG. 8 is an enlarged sectional view taken on line 8—8 of FIG. 5 showing how the lever engagement member is mounted on the wall member, FIG. 9 is an enlarged sectional view taken on line 9—9 of FIG. 5 showing the lever engagement member mounted on the wall member, FIG. 11 is an enlarged sectional view showing a state, in which the stopper and the lever engagement member are in abutment with each other.

DESCRIPTION OF THE PREFERRED EMBODIMENTS

The present invention will hereinbelow be described in further detail with reference to the accompanying drawings.

Figure 1:
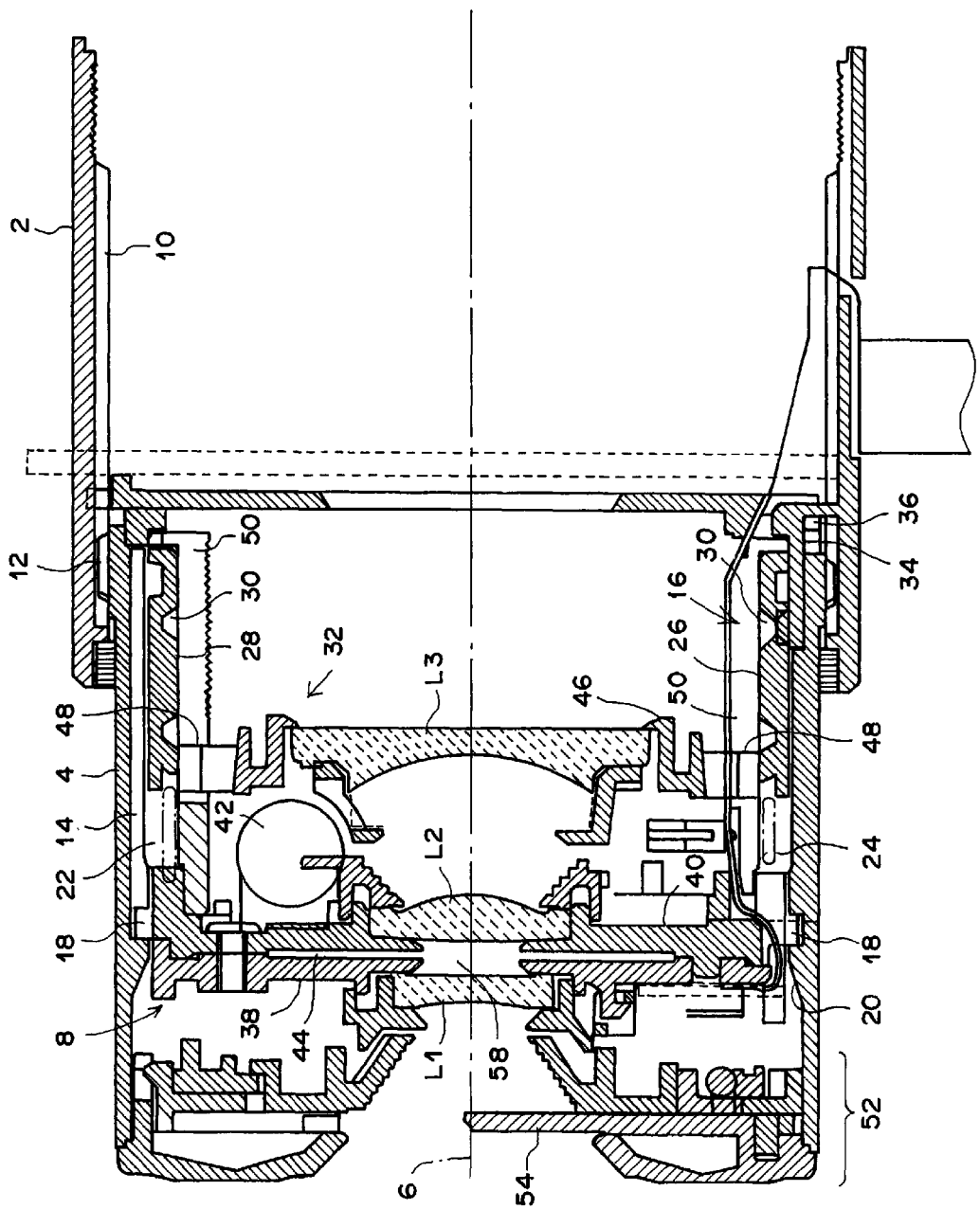
FIG. 1 is a sectional view showing a structure within a lens barrel of a camera, in which a first embodiment of the shutter mechanism for a camera in accordance with the present invention is employed.

FIG. 1 is a sectional view showing a structure within a lens barrel of a camera, in which a first embodiment of the shutter mechanism for a camera in accordance with the present invention (hereinbelow referred to simply as the shutter mechanism) is employed. FIG. 2A is a schematic front view showing a shutter chamber in a state, in which a stopper has already been located at a position for aperture restriction before shutter blades begin lens aperture opening movements. FIG. 2B is a schematic front view showing the shutter chamber in a state, in which the shutter blades have begun the lens aperture opening movements and have come into abutment with the stopper immediately before the shutter blades reach positions for full opening of the lens aperture. FIG. 3A is a schematic front view, similar to FIG. 2A, showing the shutter chamber in a state, in which the stopper has already been retracted to a position for restriction release before the shutter blades begin lens aperture opening movements. FIG. 3B is a schematic front view, similar to FIG. 2B, showing the shutter chamber in a state, in which the shutter blades have begun the lens aperture opening movements and have reached the positions for the full opening of the lens aperture. The term "forward" or the term "front" as used hereinbelow means the side on which an object to be photographed (not shown) lies.

With reference to FIG. 1, a fixed cylinder 2, which has a circular cylindrical shape, is secured to a camera body (not shown). A movable cylinder 4, which has a circular cylindrical shape, is fitted into the fixed cylinder 2 such that the movable cylinder 4 is capable of sliding along the direction of an optical axis 6 of lenses L (lenses L1, L2, and L3). A rectilinear moving cylinder 16 having a shutter unit 8 is located within the movable cylinder 4. A spiral groove 10 is formed on an inner peripheral surface of the fixed cylinder 2. Also, a helicoidal gear 12 for engaging with the spiral groove 10 is formed on an outer periphery of a back end section of the movable cylinder 4. When the movable cylinder 4 is rotated by a motor (not shown), the movable cylinder 4 is moved by the co-operation of the helicoidal gear 12 and the spiral groove 10. In this manner, the movable cylinder 4 moves forwardly from the fixed cylinder 2 or retracts into the fixed cylinder 2, while the movable cylinder 4 is rotating.

A predetermined number of straight grooves 14, 14, are formed on the inner surface of the movable cylinder 4. The straight grooves 14, 14, . . . extend along the direction of the optical axis 6 and are open at the back end of the movable cylinder 4. An annular projection 20, which is projected inwardly, is formed at the front ends of the straight grooves 14, 14, . . . The shutter unit 8 is mounted on the front part of the rectilinear moving cylinder 16. Protrusions 18, 18, . . . are formed on the outer periphery of the shutter unit 8 and at positions corresponding to the straight grooves 14, 14, . . . . An annular recess 22 is formed on the outer periphery of the rectilinear moving cylinder 16. A cam cylinder 26 is located within the annular recess 22 such that the cam cylinder 26 is capable of rotating around the rectilinear moving cylinder 16. The cam cylinder 26 is urged backwardly by a coiled spring 24. The cam cylinder 26 has a rib (not shown) formed at a predetermined position on the outer periphery so as to extend along the direction of the optical axis 6.

In order for the rectilinear moving cylinder 16 to be fitted into the movable cylinder 4, the positions of the protrusions 18, 18, . . . of the rectilinear moving cylinder 16 are matched with the positions of the straight grooves 14, 14, and the rectilinear moving cylinder 16 is inserted into the movable cylinder 4 until the protrusions 18, 18, . . . of the rectilinear moving cylinder 16 come into abutment with the annular projection 20. At this time, the rib of the cam cylinder 26 and a corresponding groove (not shown) formed on the inner surface of the movable cylinder 4 engage with each other, such that the cam cylinder 26 is capable of being moved simultaneously with the rotation of the movable cylinder 4. A spiral cam groove 30 is formed on an inner peripheral surface 28 of the cam cylinder 26. A movable lens unit (lens unit) 32, which will be described later, engages with the spiral cam groove 30 and is driven by the spiral cam groove 30 so as to move along the direction of the optical axis 6.

A gear ring 34 is mounted on the back end section of the movable cylinder 4 such that the gear ring 34 rotates together with the movable cylinder 4. A gear 36 is formed over a predetermined range on the outer periphery of the gear ring 34. The gear 36 is formed on the outer side and is driven for rotation by a motor (not shown) via a gear train (not shown) comprising a plurality of gears. The movable cylinder 4 is rotated by the rotation of the gear 36.

The shutter unit 8 will be described hereinbelow. The shutter unit 8 comprises two approximately circular disk-like shutter bases, i.e. a wall member 38 and a wall member 40, which stand facing each other and are secured by screws to each other. The shutter unit 8 also comprises the lens L1 secured to the wall member 38 and the lens L2 secured to the wall member 40. The shutter unit 8 further comprises a solenoid device 42 for operating the shutter unit 8. The wall member 38 and the wall member 40 are constituted such that, when the wall member 38 and the wall member 40 are secured to each other, a circular disk-shaped space, i.e. a shutter chamber 44, is formed between the wall member 38 and the wall member 40. Shutter blades 56, which will be described later with reference to FIGS. 2A, 2B and FIGS. 3A, 3B, are located within the shutter chamber 44. In FIG. 1, the shutter blades 56 are not shown. The shutter mechanism will be described later.

The movable lens unit 32 will be described hereinbelow. The movable lens unit 32 comprises a frame body 46 and the lens L3, which is fitted into and secured to the frame body 46. The frame body 46 is provided with pillar-shaped protrusions 48, 48, which are formed at the upper and lower sections of the frame body 46 and act as cam followers. The pillar-shaped protrusions 48, 48 engage with the spiral cam groove 30 of the cam cylinder 26 and are cam-driven by the rotation of the cam cylinder 26, i.e. the rotation of the movable cylinder 4, so as to move along the direction of the optical axis 6. Such that the frame body 46 moves linearly instead of rotating, the rectilinear moving cylinder 16 is provided with slots 50, 50 extending along the direction of the optical axis 6, and the pillar-shaped protrusions 48, 48 are located for movement within the slots 50, 50.

A cover member 52 having a barrier 54 is fitted to the front end section of the movable cylinder 4 in order to protect the lenses L (the lenses L1, L2, and L3). Though not described in detail, the cover member 52 rotates and moves together with the movable cylinder 4.

The shutter unit 8 will hereinbelow be described in more detail with reference to FIGS. 2A, 2B and FIGS. 3A, 3B. FIGS. 2A, 2B and FIGS. 3A, 3B are the views taken by separating the wall member 38 and the wall member 40 from each other and seeing the wall member 38 from the interior space, i.e. from the side of the shutter chamber 44. As an aid in facilitating the explanation, the two shutter blades 56 (56a, 56b) constituting the shutter are shown so as to be superposed one upon the other. A lens aperture 58, through which light having passed through the lens L1 passes, is formed at a center area of the wall member 38 (and at the center area of the wall member 40). By the extent of opening of the shutter blades 56, the lens aperture 58 is set at one of two degrees of opening, i.e. a state of full opening and a state, in which the aperture is slightly stopped down immediately before the state of the full opening is reached. Specifically, in the cases of telescopic photographing (i.e., zoom side photographing), the lens aperture 58 is set at the state of the full opening. In the cases of wide angle photographing (i.e., wide side photographing), the lens aperture 58 is stopped down and set at a small aperture diameter, such that incident light having large angles of deflection may be blocked. With the setting of the lens aperture 58 described above, a marginal blur is prevented from occurring in the obtained photographic image.

The shutter blade 56a and the shutter blade 56b are located in this order on the inner surface of the wall member 38, i.e. on the foreground side of the plane of the sheet of FIG. 2A. The shutter blade 56a is capable of rotating around a pin 60, which projects from the wall member 38. The shutter blade 56b is capable of rotating around a pin 62, which projects from the wall member 38. The shutter blades 56a and 56b have approximately identical curved outer shape. The shutter blade 56a comprises a wide main body section 64 (64a), an end section 66 (66a) extending in a curved form from the main body section 64a, and a fitting section 68 (68a), which is pivotably carried on the pin 60.

The shutter blade 56b comprises a wide main body section 64 (64b), an end section 66 (66b) extending in a curved form from the main body section 64b, and a fitting section 68 (68b), which is pivotably carried on the pin 62. The shutter blades 56a and 56b are markedly thin, flat plate-shaped blades and are superposed one upon the other in reverse orientations. The shutter blades 56a and 56b are located such that the main body sections 64a and 64b co-operate so as to close or open the lens aperture 58.

The fitting section 68a of the shutter blade 56a has a small hole 70a, into which the pin 60 acting as a supporting point of the shutter blade 56a for rotation is inserted, and a long hole (not shown) formed in the vicinity of the small hole 70a. The fitting section 68b of the shutter blade 56b has a small hole 70b, into which the pin 62 acting as a supporting point of the shutter blade 56b for rotation is inserted, and a long hole (not shown) formed in the vicinity of the small hole 70b. The long hole of the fitting section 68a of the shutter blade 56a and the long hole of the fitting section 68b of the shutter blade 56ba are located so as to overlap one upon the other.

As described above, the solenoid device 42 is located on the side of the wall member 40. Also, a lever 72, which is driven by the solenoid device 42, is located on the side of the wall member 40. In FIG. 2A, the solenoid device 42 is indicated by the double-dot chained line. In FIGS. 2A, 2B and FIGS. 3A, 3B, the wall member 40 is omitted, and only the lever 72 is shown. The lever 72 is a plate-like member, which extends approximately linearly and rotates around a pin (a supporting point) 74 projecting from the wall member 40. A pin 78, which comes into abutment with a driving shaft 76 of the solenoid device 42, is projected from one end of the lever 72. Also, a pin 80, which engages with the long hole of the fitting sections 68a of the shutter blade 56a and the long hole of the fitting section 68b of the shutter blade 56ba, is projected from the other end of the lever 72. The lever 72 is always urged by a coiled spring (not shown) toward the direction indicated by the arrow 82. Therefore, when the solenoid device 42 is energized, and the driving shaft 76 of the solenoid device 42 retracts toward the solenoid device 42, the lever 72 is rotated in the direction indicated by the arrow 82, and the shutter blades 56a and 56b are rotated by the lever 72 respectively around the pins 60 and 62 and in the directions such that the end sections 66a and 66b of the shutter blades 56a and 56b come close to each other.

A stopper 84 for coming into abutment with the shutter blades 56a and 56b, which are thus rotated, and thereby stopping the shutter blades 56a and 56b will be described hereinbelow. The stopper 84 is located on the side of the wall member 38 opposite to the shutter chamber 44, i.e. on the front side of the wall member 38. Therefore, in FIGS. 2A, 2B and FIGS. 3A, 3B, the stopper 84 is indicated by the broken line. The stopper 84 is formed as a lever having a bent shape, which is capable of rotating around a pin (a supporting point) 86 projecting from the wall member 38. A pin (a stopping section) 90 is projected from an end of an arm 88 of the stopper 84. The wall member 38 has a circular arc-shaped through-hole 92, which receives the pin 90 of the stopper 84, at the position corresponding to the pin 90. A pin (a section-to-be-pushed) 96 is projected from an end of an arm 94 of the stopper 84. The stopper 84 is urged by a spring 98, such that the pin 90 is ordinarily in abutment with an inner edge face (an abutment surface) 100 of the through-hole 92 of the wall member 38. The pin 90 is capable of moving within the range of the length of the through-hole 92. Specifically, the stopper 84 is capable of rotating by the angle corresponding to the movement range of the pin 90.

As illustrated in FIG. 2B, when the shutter blades 56a and 56b are rotated toward each other by being driven by the solenoid device 42, the end section 66a of the shutter blade 56a comes into abutment with the pin 90 located within the through-hole 92 and is thereby stopped. Also, since the shutter blade 56b is interlocked with the shutter blade 56a, the shutter blade 56b is stopped in the same manner as that for the shutter blade 56a. At this time, the main body section 64a of the shutter blade 56a and the main body section 64b of the shutter blade 56b shift from the position of the lens aperture 58. Specifically, the lens aperture 58 is opened, and the light having passed through the lens L1 is allowed to pass through the lens aperture 58. However, in this case, the shutter blades 56a and 56b do not reach the positions for the full opening of the lens aperture 58. Specifically, an inner edge 57 (57a) of the shutter blade 56a and an inner edge 57 (57b) of the shutter blade 56b take positions within the lens aperture 58, and the shutter blades 56a and 56b are thus stopped at the positions immediately before the positions for the full opening of the lens aperture 58 are reached. The shutter blades 56a and 56b thus take the positions which stop down the lens aperture 58, i.e. the positions for the aperture restriction. By the urging force of the spring 98, the pin 90 is kept at the predetermined position in abutment with the edge face 100 of the through-hole 92. Therefore, the stopping-down range formed by the shutter blades 56a and 56b in abutment with the pin 90, i.e. the stopping-down area, becomes equal to a predetermined area in photographing operations, and a predetermined degree of shutter opening is capable of being obtained reliably. Accordingly, images having predetermined image quality are capable of being obtained. Also, since the shutter blades 56a and 56b directly come into abutment with the pin 90, which is in abutment with the edge face 100 of the through-hole 92, without any other member intervening, problems with regard to deflection, looseness, and the like, of the intervening member do not occur, and the positions of the shutter blades 56a and 56b are capable of being determined accurately.

How the degree of shutter opening is set at the full opening will be described hereinbelow with reference to FIGS. 3A and 3B. As illustrated in FIG. 3A, in cases where the shutter blades 56a and 56b are to fully open the lens aperture 58, the stopper 84 is retracted previously by stopper releasing means against the urging force of the spring 98 and toward an other edge face 102 of the through-hole 92. The stopper releasing means for rotating the stopper 84 to the retracted position will be described later. The position, to which the stopper 84 is retracted, is outside the range of the movement loci of the end sections 66a and 66b of the shutter blades 56a and 56b. Therefore, as illustrated in FIG. 3B, in cases where the shutter blades 56a and 56b are rotated toward each other, the end sections 66a and 66b of the shutter blades 56a and 56b do not come into abutment with the pin 90. Accordingly, the shutter blades 56a and 56b are capable of rotating without being obstructed by the pin 90 until the inner edges 57 (57a and 57b) of the shutter blades 56a and 56b take positions outward from the lens aperture 58. In this manner, the lens aperture 58 is fully opened.

The stopper releasing means for moving the stopper 84 to the retracted position will be described hereinbelow with reference to FIGS. 4A and 4B. FIG. 4A is a schematic front view showing the shutter unit 8 in a state, in which the stopper releasing means allows the stopper 84 to be located at the position for the aperture restriction. FIG. 4B is a schematic front view showing the shutter unit 8 in a state, in which the stopper releasing means operates in order to retract the stopper 84 to the position for the restriction release. A arc-shaped rib 104 is formed along the inner surface of the movable cylinder 4. Since the rib 104 is secured to the movable cylinder 4, when the movable cylinder 4 is rotated, the rib 104 moves together with the movable cylinder 4 by the angle identical with the movement angle of the movable cylinder 4. The rib 104 acts as the stopper releasing means. The rib 104 has a width (a height) capable of interfering with the pin 96 of the stopper 84, which is located at the position for the aperture restriction. A tapered section 106 and a rib 104a having a small height are formed at an end section of the rib 104.

In FIG. 4A, the photographing mode of the camera is set at the wide side photographing mode. In the wide side photographing mode, the rib 104 is located at the position that does not interfere with the pin 96 of the stopper 84. Therefore, the stopper 84 is kept at the position for the aperture restriction, such that the pin 90 of the stopper 84 is in abutment with the inner edge face 100 of the through-hole 92 by being urged by the spring 98. In such cases, as illustrated in FIG. 2B, when the shutter is operated, the lens aperture 58 is stopped down by the shutter blades 56a and 56b.

In cases where the movable cylinder 4 is rotated in the direction indicated by the arrow 108, and the camera is set in the zoom side photographing mode, the movable cylinder 4 takes the position shown in FIG. 4B. When the movable cylinder 4 is thus rotated, the pin 96 of the stopper 84 is moved along the tapered section 106 and rides on the rib 104. As a result, the stopper 84 is rotated, and the pin 90 of the stopper 84 is retracted toward the other edge face 102 of the through-hole 92. Therefore, the shutter blades 56a and 56b do not come into abutment with the pin 90 during the opening movements, and the lens aperture 58 is capable of being fully opened as illustrated in FIG. 3B.

Figure 5:
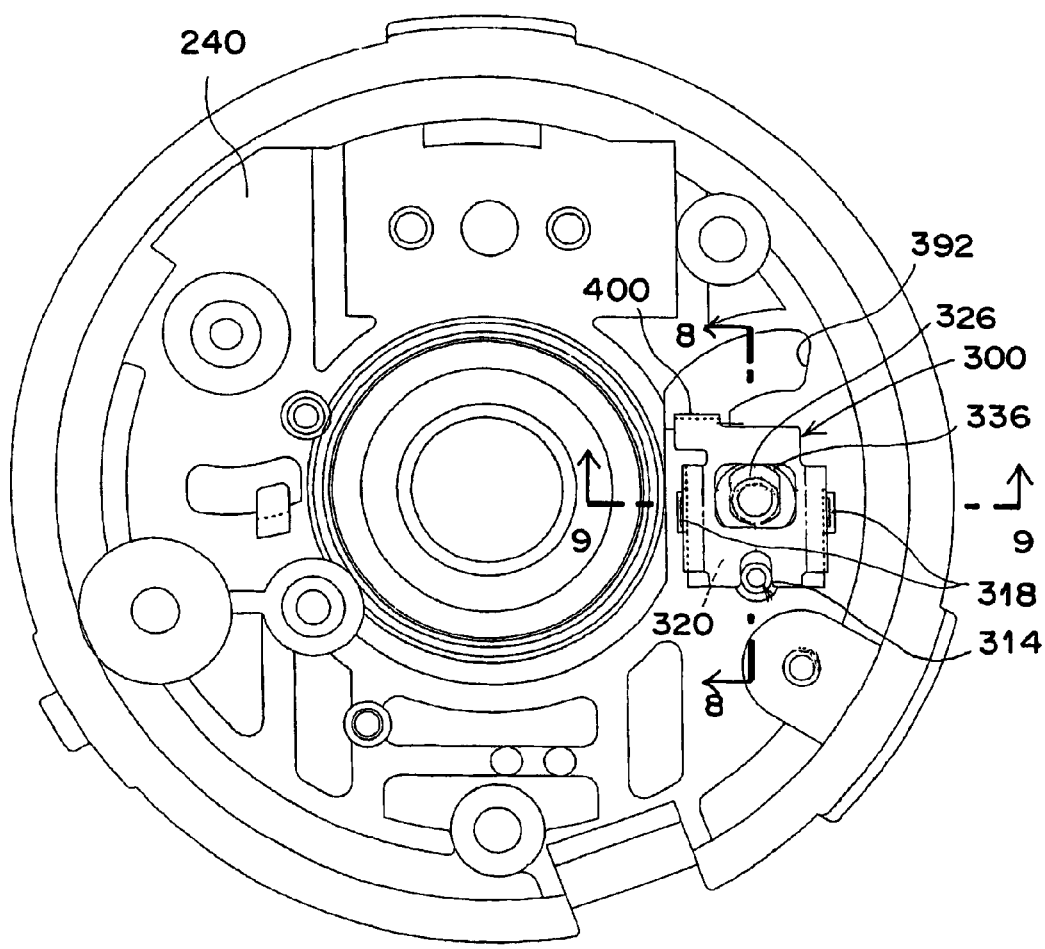
FIG. 5 is a schematic view showing a wall member constituting a shutter chamber in a second embodiment of the shutter mechanism for a camera in accordance with the present invention, in which a lever engagement member having an abutment surface is utilized, the view being taken from a back side.
Figure 7:
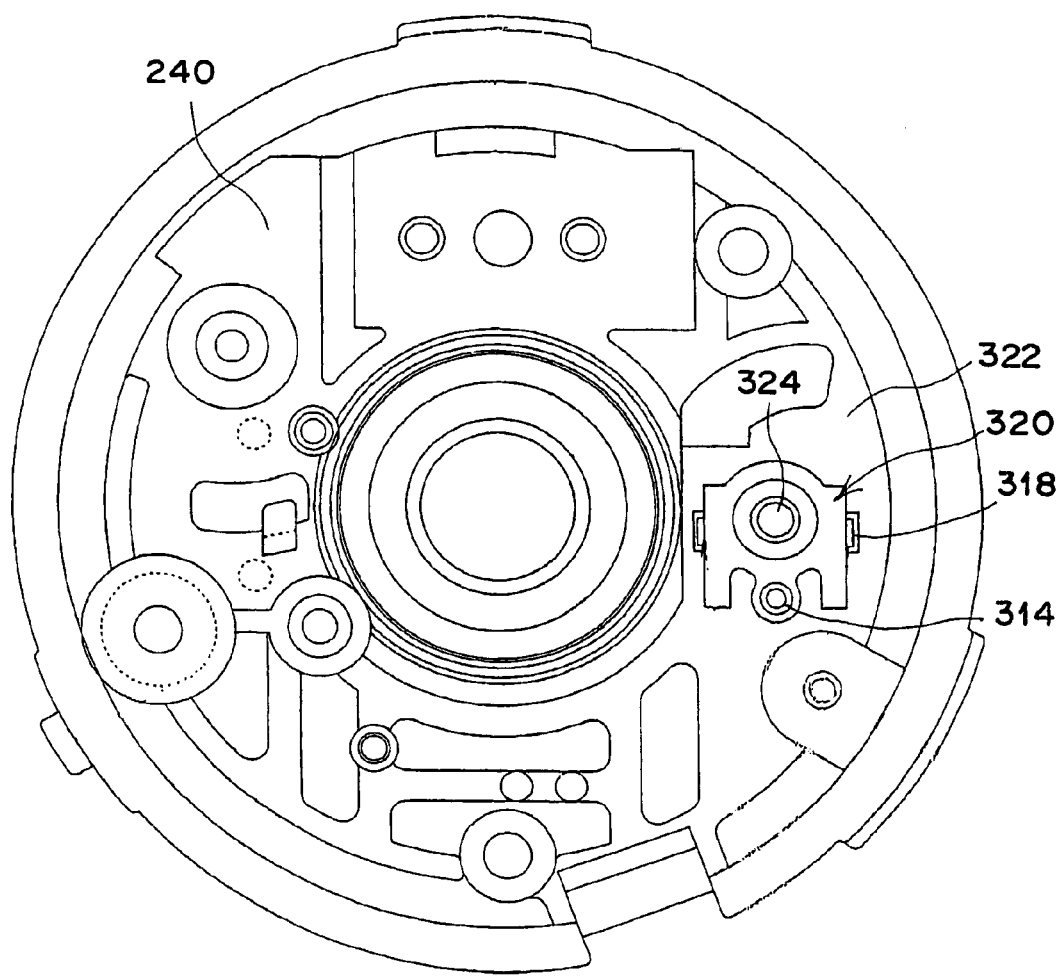
FIG. 7 is a view similar to FIG. 5 with the lever engagement member being removed.
Figure 10:
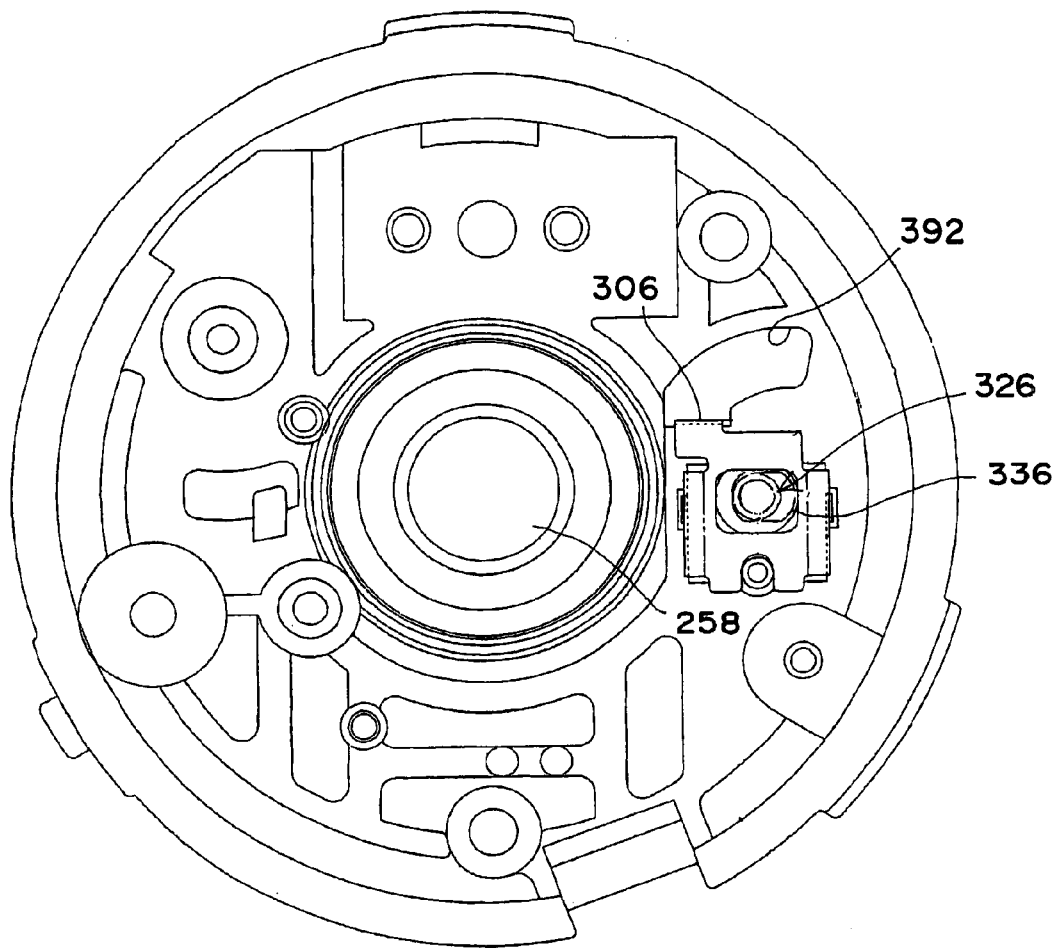
FIG. 10 is a view similar to FIG. 5 showing a state, in which the lever engagement member has been shifted.

A second embodiment of the shutter mechanism for a camera in accordance with the present invention will be described hereinbelow with reference to FIGS. 5 to 11. FIG. 5 is a schematic view showing a wall member constituting a shutter chamber in the second embodiment of the shutter mechanism for a camera in accordance with the present invention, in which a lever engagement member having an abutment surface is utilized, the view being taken from a back side. FIG. 6A is a plan view showing the lever engagement member. FIG. 6B is a side view showing the lever engagement member. FIG. 6C is a sectional view taken on line c—c of FIG. 6A, in which only the sectional part is shown. FIG. 6D is a sectional view taken on line d—d of FIG. 6A, in which only the sectional part is shown. FIG. 7 is a view similar to FIG. 5 with the lever engagement member being removed. FIG. 8 is an enlarged sectional view taken on line 8—8 of FIG. 5 showing how the lever engagement member is mounted on the wall member. FIG. 9 is an enlarged sectional view taken on line 9—9 of FIG. 5 showing the lever engagement member mounted on the wall member. FIG. 10 is a view similar to FIG. 5 showing a state, in which the lever engagement member has been shifted. FIG. 11 is an enlarged sectional view showing a state, in which the stopper and the lever engagement member are in abutment with each other. In these drawings, similar elements are numbered with the same reference numerals with respect to the preceding drawings.

As illustrated in FIG. 5 and FIGS. 6A to 6D, a lever engagement member 300 for stopping a stopper 284 illustrated in FIG. 11 is located on an outer surface side of a wall member 240 located on the side of the solenoid device 42, which outer surface side is opposite to a shutter chamber. The wall member 240 has a through-hole 392, which has the shape identical with the shape of the through-hole 92 described above and is located at the position corresponding to the position of the through-hole 92. The lever engagement member 300 an approximately rectangular plan shape and is mounted through latch engagement on a mounting section 320 of the wall member 240. The lever engagement member 300 has an abutment surface 200, which is located so as to project from an inner peripheral edge of the through-hole 392 toward the internal region of the through-hole 392.

As illustrated in detail in FIGS. 6A to 6d, the lever engagement member 300 is made from a single metal plate with punching and bending processes. The lever engagement member 300 has a planar main surface 302. Also, the lever engagement member 300 has side plates 304, 304, which extend from the two sides of the main surface 302 and are then bent downwardly. Also, the main surface 302 continues into an abutment plate 306, which is bent from the top left area in FIG. 6A downwardly, i.e. toward the background side of the plane of the sheet of FIG. 6A. A rectangular through-hole 308, which is utilized when the position of the lever engagement member 300 is to be adjusted, is formed approximately at the center area of the main surface 302. A cut-away region 312 is formed at an edge 310 of the main surface 302 on the side opposite to the abutment plate 306. The cut-away region 312 engages with a protrusion (i.e., a boss) 314 (shown in FIG. 5 and FIG. 7), which is formed on the mounting section 320 of the wall member 240. The cut-away region 312 thus acts as a guide when the position of the lever engagement member 300 is to be adjusted. Also, a rectangular engagement hole 305 is formed approximately at the center area of each of the side plates 304, 304. The engagement holes 305, 305 engage with latch protrusions 318, 318, which are formed on the wall member 240. In FIG. 5, a position adjusting jig 326 is shown within the through-hole 308 of the lever engagement member 300.

The mounting section 320 of the wall member 240, on which the lever engagement member 300 is to be mounted, will be described hereinbelow with reference to FIG. 7. The mounting section 320 is formed as an integral body with the wall member 240 and takes on the form of a base protruding from an outer surface 322 of the wall member 240. A hole 324 for receiving the position adjusting jig 326 is formed at the center area of the upper surface of the mounting section 320. When the position of the lever engagement member 300 is to be adjusted by use of the position adjusting jig 326, the position adjusting jig 326 is inserted into the hole 324 of the mounting section 320. Also, the boss 314 described above is projected from the lower end section of the mounting section 320, as viewed in FIG. 7. When the lever engagement member 300 is moved for position adjustment, the boss 314 co-operates with the cut-away region 312 of the lever engagement member 300 in order to guide the lever engagement member 300, such that the lever engagement member 300 moves in a straight line.

How the lever engagement member 300 is mounted on the mounting section 320 of the wall member 240 and how the position of the lever engagement member 300 is adjusted will be described hereinbelow with reference to FIG. 8 and FIG. 9. As illustrated in FIG. 9, each of the engagement holes 305, 305 formed in the side plates 304, 304 of the lever engagement member 300 engages with one of the latch protrusions 318, 318 of the mounting section 320 of the wall member 240, and the lever engagement member 300 is thereby secured to the mounting section 320. In this manner, the lever engagement member 300 is prevented by the latch protrusions 318, 318 from moving upwardly in FIG. 9. However, as illustrated in FIG. 8, the lever engagement member 300 is supported by frictional force on the mounting section 320, such that the lever engagement member 300 is capable of being moved in the directions indicated by the double-headed arrow Y. Specifically, each of the latch protrusions 318, 318 has a size smaller than each of the engagement holes 305, 305 and, as illustrated in FIG. 5, the abutment surface 200 of the abutment plate 306 of the lever engagement member 300 is capable of moving within the through-hole 392 of the wall member 240. As illustrated in FIG. 9, each of the side plates 304, 304 is slightly curved upwardly from the main surface 302 and is then bent downwardly. Also, tapered sections 328, 328 are formed at the upper corner areas of the mounting section 320, and therefore the bent areas of the side plates 304, 304 do not interfere with the mounting section 320. Accordingly, the side plates 304, 304 are capable of having elasticity appropriate for latch engagement with the latch protrusions 318, 318.

As illustrated in FIG. 8, the boss 314 of the mounting section 320 is located within the cut-away region 312 of the lever engagement member 300. A circular pillar-shaped bottom end section (hereinbelow referred to simply as the bottom end section) 330 of the position adjusting jig 326 is fitted into the hole 324 of the mounting section 320. The bottom end section 330 is co-axial with a main body 332 of the position adjusting jig 326. The main body 332 has a convex cam section 334 at a position adjacent to the bottom end section 330. The convex cam section 334 is eccentric with respect to the main body 332, and the end face of the convex cam section 334 is formed as an arc-shaped surface 336, which comes into contact with the inner edge of the through-hole 308 of the lever engagement member 300. FIG. 8 shows the state, in which the arc-shaped surface 336 of the position adjusting jig 326 pushes the inner edge of the through-hole 308 of the lever engagement member 300 toward the right side, and the abutment plate 306 of the lever engagement member 300 is thereby pushed to the right side, i.e. toward the through-hole 392 of the wall member 240.

In cases where the position adjusting jig 326 is rotated by an angle of 90° from the state shown in FIG. 8, and the convex cam section 334 is thus moved from the position for pushing the inner edge of the through-hole 308 of the lever engagement member 300, the abutment plate 306 of the lever engagement member 300 takes the position indicated by the double-dot chained line in FIG. 8. FIG. 10 shows the orientation of the position adjusting jig 326 after being rotated by an angle of 90° from the state shown in FIG. 8. As illustrated in FIG. 10, in this state, the extent of projection of the abutment plate 306 into the through-hole 392 of the wall member 240 is smaller than in the state shown in FIG. 5. In this manner, in cases where the position adjusting jig 326 is rotated by an arbitrary angle, the position of the lever engagement member 300 with respect to the through-hole 392 of the wall member 240 is capable of being adjusted arbitrarily. When the adjustment of the position of the lever engagement member 300 is finished, the lever engagement member 300 is secured to the mounting section 320 by use of an adhesive agent, or the like. The operations for adjusting the position of the lever engagement member 300 and securing the lever engagement member 300 by use of the adhesive agent, or the like, are performed during the processes for producing the camera. Therefore, regardless of fluctuation in parts, a camera in which the stopping-down of the shutter is uniform is capable of being obtained.

The relationship between the lever engagement member 300 and a pin (a stopping section) 290 of the stopper 284 will be described hereinbelow with reference to FIG. 11. The stopper 284 is supported for rotation on a pin (a supporting point) 286 of a wall member 238, which is located on the front side of a shutter chamber 244. The pin 290 projecting from the stopper 284 is longer than the pin 90 of the stopper 84 in the first embodiment described above. The pin 290 passes through the shutter chamber 244 and projects into the through-hole 392 of the wall member 240. In the first embodiment described above, the edge face 100 of the through-hole 92 of the wall member 38, on which the stopper 84 is formed, acts as the abutment surface. However, in the second embodiment, the pin 290 of the stopper 284 comes into abutment with the abutment plate 306 of the lever engagement member 300 located on the wall member 240. In the second embodiment, the surface of abutment plate 306, which surface comes into abutment with the stopper 284, is formed as the abutment surface 200. In cases where the abutment plate 306 is located at a position more rightward than the position shown in FIG. 11, the position of abutment of the pin 290 of the stopper 284 shifts toward the right side. Specifically, in such cases, the opening movements of the shutter blades 56a and 56b are restricted at a stage earlier than in the cases of FIG. 11 before the shutter blades 56a and 56b reach the positions for the full opening of a lens aperture 258 (shown in FIG. 10). Therefore, the lens aperture 258 is stopped down to an area smaller than in the cases of FIG. 11. The constitution for moving the stopper 284 to the position for the restriction release is the same as that in the first embodiment described above.

What is claimed is:

1. A shutter mechanism for a camera, comprising:
   i) a lens shutter constituted of a plurality of shutter blades, which are capable of being moved within a shutter chamber of a camera in order to open and close a lens aperture, and
   ii) a stopper, which is capable of entering into movement loci of the shutter blades, the stopper selectively taking a position for aperture restriction that stops the shutter blades immediately before the shutter blades reach positions for full opening of the lens aperture during opening movements of the shutter blades, or a position for restriction release that allows the shutter blades to reach the positions for the full opening of the lens aperture,
   wherein the stopper is urged by a spring toward the position for the aperture restriction, and
   the stopper is retracted by stopper releasing means to the position for the restriction release in cases where the lens aperture is to be fully opened.

2. A shutter mechanism as defined in claim 1 wherein the stopper is a lever for rotation around a supporting point, which lever is provided with a stopping section that stops the shutter blades, and
   the lever is urged by the spring such that the stopping section of the lever is ordinarily in abutment with an abutment surface, which is formed on the side of a wall member constituting the shutter chamber and is located at a predetermined position within the movement loci of the shutter blades.

3. A shutter mechanism as defined in claim 2 wherein the lever is provided with a section-to-be-pushed, which is formed on the side opposite to the stopping section with the supporting point of the lever intervening between the section-to-be-pushed and the stopping section, and the section-to-be-pushed is adapted to be pushed by the stopper releasing means such that the stopping section is retracted to the position for the restriction release.

4. A shutter mechanism as defined in claim 2 or 3 wherein a lever engagement member is associated with the wall member constituting the shutter chamber, such that the position of the lever engagement member is capable of being adjusted in a direction heading towards the stopping section of the lever and in a direction heading away from the stopping section of the lever, and
   the abutment surface is formed on the lever engagement member.

* * * * *